Dec. 29, 1942.  E. L. MACK  2,306,967

FASTENER

Filed July 6, 1942

INVENTOR

Edward L. Mack.

Patented Dec. 29, 1942

2,306,967

UNITED STATES PATENT OFFICE 2,306,967

FASTENER

Edward L. Mack, New York, N. Y.

Application July 6, 1942, Serial No. 449,875

12 Claims. (Cl. 24—221)

This invention relates generally to a new and improved fastening device adapted for detachably fastening together two separate parts or sheets of material, and the invention particularly relates to an improved airplane cowl fastener, or fastener adapted to serve in a related manner for holding readily detachable sheet metal parts in close proximity under spring tension.

An object of the invention is to provide a fastener of this general type which has a minimum of simplified parts, which is economical to manufacture and to assemble, which also may be easily and efficiently applied in place upon the parts to be fastened by modern manufacturing practices, and wherein the fastened parts are quickly detachable and then replaceable to prior fastened position with little effort and simple tools.

An important object of the invention is the elimination of grommets in such fasteners, and the provision of an arrangement of parts which permits the use of extremely short studs.

An important object of the invention is the combination of parts in such a fastener which permits the use of a die cut and die formed bracket means with which a spring is associated and which in two economical cooperating metal stampings, provide sheet attachment means, spring holding means and spring travel limit means, the latter preventing abnormal sheet separation.

With the above and other objects in view, my invention will be readily understood from a preferred illustrative embodiment hereinafter described in connection with the accompanying drawing which, it is to be understood, is not to be deemed as limiting the scope of my invention.

Figure 1:
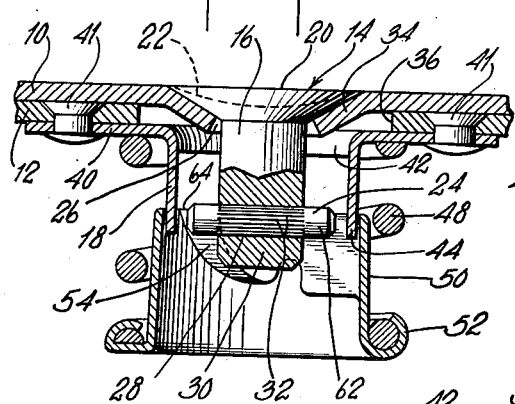
Fig. 1 is a section, with certain portions in perspective and partly broken away, of a fastener embodying my invention with the parts in operative position but not interlocked.

The embodiment of my invention shown in the above identified figures may be said to diagrammatically illustrate the connection of two plate member 10 and 12 of an airplane cowling assembly which it is desired to hold in close proximity and relatively fixed position under spring tension by means of a fastener or coupling generally indicated as 14.

The fastener 14 comprises two main parts, namely a rotatable stud member 16 and a cooperative receptacle or bracket member 18 for detachable interlocking engagement therewith.

The rotatable stud member will normally be provided with a flat head member 20 having therein a slot 22 so that the stud member 16 may be rotated by means of a coin or screw driver or other tool being inserted in slot 22. Also stud member 16 will be provided, adjacent its opposite end, with a preferably round cross-bar member 24, which latter will ordinarily be mounted therein after stud 16 has been inserted through an opening 26 in sheet 10. The cross-bar member 24 will normally be inserted through a transverse passage 28 in the shank 30 of stud 16 so that the cross-bar is perpendicular to the vertical axis of the stud; also ordinarily longitudinal corrugations 32 of slightly greater diameter will be provided upon cross-bar member 24 so that the cross-bar which is arranged to closely fit in passage 28 can be locked in position therein by being forced into place by a positioning tool provided with properly shaped jaws akin to plier jaws, and it will be recognized, that if desired, an automatic feed for automatically feeding the cross-bar to operative positions in such jaws, may be provided.

Therefore, by such a disposition of elements, it will be apparent that the stud member 16 may be rotatably connected to sheet 10, in such fashion that the outer portion of stud head 20 will be approximately flush with the outer portion of member 10. The latter result may be particularly accomplished by the provision of an angulated flange member 34 which is provided adjacent hole 26 in sheet 10 which latter, as well as registering hole 36 in sheet 12, will ordinarily be provided by means of conventional punch mechanisms and forming die mechanisms associated therewith.

Cooperating with rotatable stud member 16 is a receptacle member 18 which will normally be formed as indicated with a die cut and formed sheet metal base member 40 secured to sheet 12 with rivets 41 and having a downwardly turned generally circular flange portion 42 and two downwardly turned guide members 44 which latter are integral with the base and are parallel to the longitudinal axis of stud 16.

Figure 3:
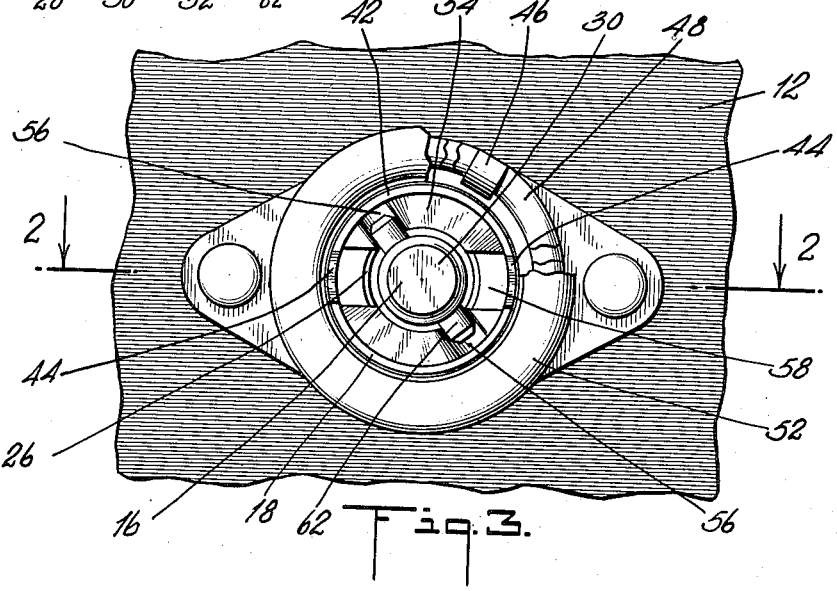
Fig. 3 is a bottom plan view of the fastener illustrated in Fig. 1.

As indicated in Fig. 3 a tab 46 may be struck downwardly from base portion 40 to securely hold spring 48 in place thereon; preferably there will be at least two of such tabs 46 (one indicated) arranged to serve as a spring holding means in this connection.

Figure 4:
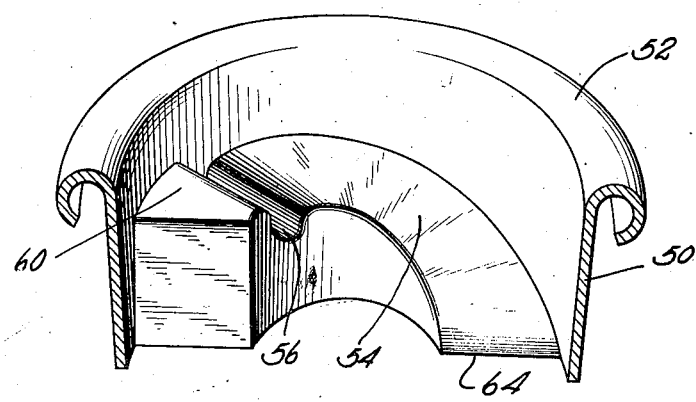
Fig. 4 is a perspective view, partly in section of the die cut and die formed (metal stamping) cup means which forms a part of the bracket means in my invention.

Secured to the other end of the spring 48 is a slotted die cut and formed sheet metal cup means 50 which is provided preferably with an outwardly extending flange 52 for holding the outer end of spring 48 by tensioning thereagainst. The inner or bottom part of the cup, (or as it is shown in Fig. 1, the upper part of cup 50 since the same is upside down) is provided with two spiral tracks 54, as indicated in Fig. 4, and each of the tracks at its upper end is provided with a detent 56 for accommodating the outer ends of cross-bar 24, all as illustrated. The guide members 44 are preferably arranged in sliding contact or engagement with the inside of cup member 50, and said two guides, as indicated in Fig. 3, are slightly less but approximate the width of slot 58, with slot 58 separating the two spiral tracks 54. Members 44 serve to prevent the rotation of cup 50 relative base 40. Also the slot 58 permits the inserting of the cross-bar end of stud 16 through the bottom of cup 50, with the arrangement of parts shown in Fig. 1; thereafter, with this construction and disposition of elements, a rotation of stud 16 will cause the cross-bar arms to travel on spiral tracks 54 and to seat in detents 56, under spring tension of spring 48. The raised portion 60 of the tracks 54 operate as a stop to prevent further rotation of stud 16. Cup 50 is urged upwardly toward sheet member 12.

Figure 2:
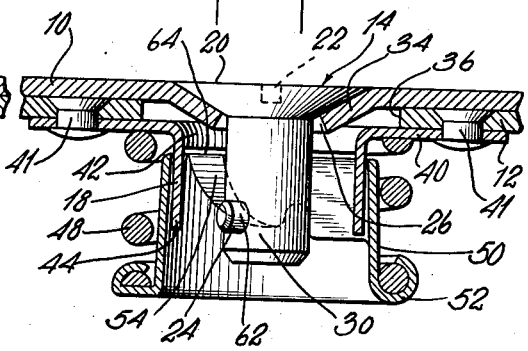
Fig. 2 is a section taken on line 2—2 of Fig. 3 and is generally similar to Fig. 1 but with the fastener parts in interlocked position.

With the parts arranged as in Fig. 1, rotation of stud 16 will cause the ends of cross-bar member 24 to traverse the lowermost portion of spiral tracks 54 and continued rotation will result in the deposition of cross-bar member ends 62 in detents 56 in which position spring member 48 will hold the two cooperating fastener parts 16 and 18 in firm detachable interlocked connection under spring tension, with the parts in the general relationship indicated in Figs. 2 and 3.

As will be apparent from a viewing of Fig. 2 the abnormal separation of sheets 10 and 12 will be prevented by the impingement of a portion identified as 64 of the spiral tracks 54, upon the flange 42 of base member 40 thus providing an effective travel limit means, wherein all parts are formed of relatively inflexible material, or sheet metal stampings.

It will also be apparent from a viewing of Fig. 2 that the downwardly angulated flange member 34 of sheet 10 may operate to a certain extent as a centering means to center the stud 16 in respect to receptacle 18 by having the flange 34 contact and bear against flange 42 of base 40; these two parts may also be arranged to act as a bevelled centering means and bearing surface to overcome lateral stresses and vibratory movements of the fastener when the stud and receptacle are interlocked and when the cowling is subjected to the movements attendant to its normal uses.

It will be further recognized that the embodiment of my invention above described is a preferred form and illustrative only, and that substitutions of materials and various modifications or reversals of parts may be made without departing from the spirit or the scope of my invention which is defined in the following claims.

What I claim is:

1. A detachable fastener for maintaining two parts in close proximity under spring tension, which includes a rotatable stud member for connection to one part, said stud member being provided with a head at one end and a cross-bar adjacent the other end, and a cooperating receptacle member for connection to the second part, said receptacle member including a base member, resilient means connected thereto, a separate slotted cup member connected to said resilient means so that normally the main portion of said cup member is spaced apart from said base member, spiral tracks disposed in the inner portion of said cup member, and detents at the end of said spiral tracks for receiving and holding said cross-bar.

2. A detachable fastener for maintaining two parts in close proximity under spring tension, which includes a rotatable stud member for connection to one part, said stud member being provided with a head at one end and a cross-bar adjacent the other end, and a cooperating receptacle member for connection to the second part, said receptacle member including a base member, a coil spring connected at one end to said base member, a slotted cup member connected to the other end of said spring with the cup member having a portion inside the coil of said spring and so that normally the main portion of said cup member is spaced apart from said base member, spiral tracks disposed in the inner portion of said cup member, and detents at the ends of said spiral tracks, all of said parts being so constructed and arranged so that the rotation of said stud member at first engages the cross-bar upon said spiral tracks and continued rotation seats the cross-bar in said detents with the two parts in close proximity under spring tension.

3. A fastener as defined in claim 2 wherein a portion of said base member in the form of a tab is struck upwardly and engages the spring member to hold the same in firm connective relation.

4. A fastener as defined in claim 2 wherein guide means are additionally provided for said receptacle member and are adapted to prevent the rotation of said cup member.

5. A receptacle as defined in claim 2 wherein guide means are provided upon said base member for slidingly engaging said cup member and preventing a rotation thereof relative said base member.

6. A fastener as defined in claim 2 wherein said base member is provided with integral guide means adapted to project through the slot of said slotted cup member to prevent the rotation of the same and wherein the outer portion of said cup member is provided with a flange adapted to be tensioned against a portion of said spring.

7. A fastener as defined in claim 2 wherein the parts are so constructed and arranged that a portion of said cup member and its associated parts will impinge upon a portion of said base member when the spring is compressed a predetermined amount thereby providing a relatively inflexible travel limit means for preventing abnormal separation of said parts.

8. A detachable fastener for maintaining two parts in close proximity under spring tension, which includes a rotatable stud member for connection to one part, said stud member being provided with a head at one end and transverse projecting portions adjacent the other end, and a cooperating receptacle member for connection to the second part, said receptacle member including a base member, a spring associated therewith, a separate slotted cup member also associated with said spring so that normally the main portion of said cup member is spaced apart from said base member and spiral tracks disposed in the inner portion of said cup member, said transverse projecting portions of said stud member adapted to travel upon said spiral tracks to compress said spring member and to hold the two parts in close proximity under spring tension.

9. A fastener as defined in claim 8 wherein detents are provided at the end of said spiral tracks and one side of said detents take the form of a stop portion.

10. A detachable fastener for maintaining two parts in close proximity under spring tension, which includes a rotatable stud member for connection to one part, said stud member being provided with a head at one end and a cross-bar adjacent the other end, and a cooperating receptacle member for connection to the second part, said receptacle member including a slotted cup member having relatively extended side walls, resilient means associated therewith, spiral tracks in the bottom of said cup member, and detents at the ends of said tracks, the said elements being so constructed that rotation of stud member at first engages the cross-bar upon said tracks and continued rotation seats the cross-bar in said detents with the two parts in close proximity under spring tension.

11. A detachable fastener for maintaining two parts in close proximity under spring tension, which includes a rotatable stud member for connection to one part, said stud member being provided with a head at one end and a cross-bar adjacent the other end, and a cooperating receptacle member for connection to the second part, said receptacle member including a slotted cup member normally movable relative said second part and having side walls, resilient means associated with said cup member, spiral tracks in said cup member, and detents at the ends of said tracks, the said elements being so constructed that rotation of said stud member at first engages the cross-bar upon said tracks and continued rotation seats the cross-bar in said detents with the two parts in close proximity under spring tension.

12. A fastener as defined in claim 11 wherein a portion of said cup member will impinge upon a relatively inflexible member when the spring is compressed a predetermined amount thereby providing a relatively inflexible travel limit means for preventing abnormal separation of said parts.

EDWARD L. MACK.